United States Patent [19]
Herd et al.

[11] Patent Number: 5,532,663
[45] Date of Patent: Jul. 2, 1996

[54] SUPPORT STRUCTURE FOR A SUPERCONDUCTING COIL

[75] Inventors: Kenneth G. Herd, Niskayuna; Evangelos T. Laskaris, Schenectady, both of N.Y.

[73] Assignee: General Electric Company, Schenectady, N.Y.

[21] Appl. No.: 402,439

[22] Filed: Mar. 13, 1995

[51] Int. Cl.⁶ ............... H02K 55/00; H02K 9/00; H01F 7/00
[52] U.S. Cl. ............... 335/216; 310/52; 310/54; 310/261; 62/51.1; 505/877; 505/878; 505/879; 505/888
[58] Field of Search ............... 335/216; 310/52, 310/54, 261; 62/51.1, 51.3, 505; 505/211, 166, 876, 877, 878, 879, 888

[56] References Cited

U.S. PATENT DOCUMENTS

| | | | |
|---|---|---|---|
| 3,891,875 | 6/1975 | Laskaris | 310/40 |
| 3,980,981 | 9/1976 | Boom et al. | 335/216 |
| 3,991,333 | 11/1976 | Laskaris | 310/52 |
| 4,048,529 | 9/1977 | Pomeroy et al. | 310/54 |
| 4,082,967 | 4/1978 | Laskaris | 310/64 |
| 4,291,997 | 9/1981 | Laskaris | 403/24 |
| 4,379,275 | 4/1983 | Elsel | 335/216 |
| 4,418,325 | 11/1983 | Elsel | 335/216 |
| 5,216,888 | 6/1993 | Kupiszewski et al. | 62/45.1 |
| 5,381,122 | 1/1995 | Laskaris et al. | 335/216 |

OTHER PUBLICATIONS

U.S. Patent Application Ser. No. 08/267/625, filed Jun. 29, 1994, by Evangelos t. Laskaris et al., entitled "Superconducting Rotor for an Electrical Machine".

*Primary Examiner*—Leo P. Picard
*Assistant Examiner*—Raymond M. Barrera
*Attorney, Agent, or Firm*—Douglas E. Erickson; Marvin Snyder

[57] ABSTRACT

A superconducting device, such as a superconducting rotor for a generator or motor or a superconducting magnet for a magnetic resonance imaging machine, etc. A vacuum enclosure surrounds and is spaced apart from a superconductive coil. Apparatus supports the coil in the enclosure during operation of the device, such apparatus including a first thermally insulative honeycomb assemblage positioned between the coil and the enclosure. In a first preferred construction, the first honeycomb assemblage is positioned between and connected to the coil and a thermal shield, and a second honeycomb assemblage is positioned between and connected to the shield and the enclosure. In a second preferred construction, the second honeycomb assemblage is replaced with a first suspension strap.

7 Claims, 5 Drawing Sheets

SUPPORT STRUCTURE FOR A SUPERCONDUCTING COIL

BACKGROUND OF THE INVENTION

The present invention relates generally to superconductivity, and more particularly to supporting a superconductive coil in a superconducting device.

Superconducting devices include, but are not limited to, superconducting rotors for synchronous electrical machines, such as generators and motors, and superconducting magnets for MRI (magnetic resonance imaging) machines, maglev (magnetic levitation) transportation systems, magnetic energy storage devices, and linear motors. The superconductive coil or coils in a superconducting device are made from a superconducting material, such as niobium-tin, requiring a temperature at or below a critical temperature to achieve and maintain superconductivity. Cooling techniques include cooling an epoxy-impregnated coil through a solid conduction path from a cryocooler or through cooling tubes containing a liquid and/or gaseous cryogen and cooling a porous coil by immersion in a liquid and/or gaseous cryogen. The superconductive coil typically is surrounded by a vacuum enclosure. In a particular application, a thermal shield may be added between the superconductive coil and the vacuum enclosure.

Applicants are aware of techniques for supporting the superconductive coil in the superconducting device which include using racetrack-shaped, uni-directional filamentary-reinforced-epoxy (FRE) suspension straps between mounting pins connected to the superconductive coil and the thermal shield and between mounting pins connected to the thermal shield and the vacuum enclosure. Such straps can be costly and require complex mounting pin or other hardware to support and transmit the coil loads evenly, especially in the case of rotating coils, such as those in a superconducting rotor where centrifugal loading on the coils can be substantial. What is needed is a superconducting device having an improved support structure for its superconductive coil or coils.

SUMMARY OF THE INVENTION

It is an object of the invention to provide a superconducting device having a support structure for its superconductive coil or coils.

The superconducting device of the invention includes a superconductive coil, a vacuum enclosure surrounding and spaced apart from the superconductive coil, and apparatus for supporting the superconductive coil in the vacuum enclosure during operation of the superconducting device, wherein the apparatus includes a first thermally insulative honeycomb assemblage positioned between the superconductive coil and the vacuum enclosure.

In a preferred embodiment, the superconducting device is a superconducting rotor and further includes a thermal shield and a first thermally insulative, racetrack-shaped suspension strap. The thermal shield is positioned within and spaced apart from the vacuum enclosure and surrounds and is spaced apart from the superconductive coil. The first thermally insulative honeycomb assemblage is positioned between and connected to the superconductive coil and the thermal shield. The racetrack-shaped strap is positioned between and connected to the thermal shield and the vacuum enclosure. The thermal shield has a first pin near the radially outermost portion of the thermal shield, and the vacuum enclosure has a second pin near the radially innermost portion of the vacuum enclosure, wherein the pins project, with respect to the axis of rotation of the superconducting rotor, along generally opposite circumferential directions, and wherein the racetrack-shaped strap is positioned to encompass the first and second pins.

Several benefits and advantages are derived from the invention. The first thermally insulative honeycomb assemblage offers a simple, low cost way to support the superconductive coil from the thermal shield. By extending the racetrack-shaped strap from near the radially outermost portion of the thermal shield to near the radially innermost portion of the vacuum enclosure, the thermal shield can be supported from the vacuum enclosure while keeping the outer diameter of the vacuum enclosure to a minimum which reduces the size of the superconducting rotor.

BRIEF DESCRIPTION OF THE DRAWINGS

The accompanying drawings illustrate several preferred embodiments of the present invention wherein.

DETAILED DESCRIPTION OF THE INVENTION

Figure 1:
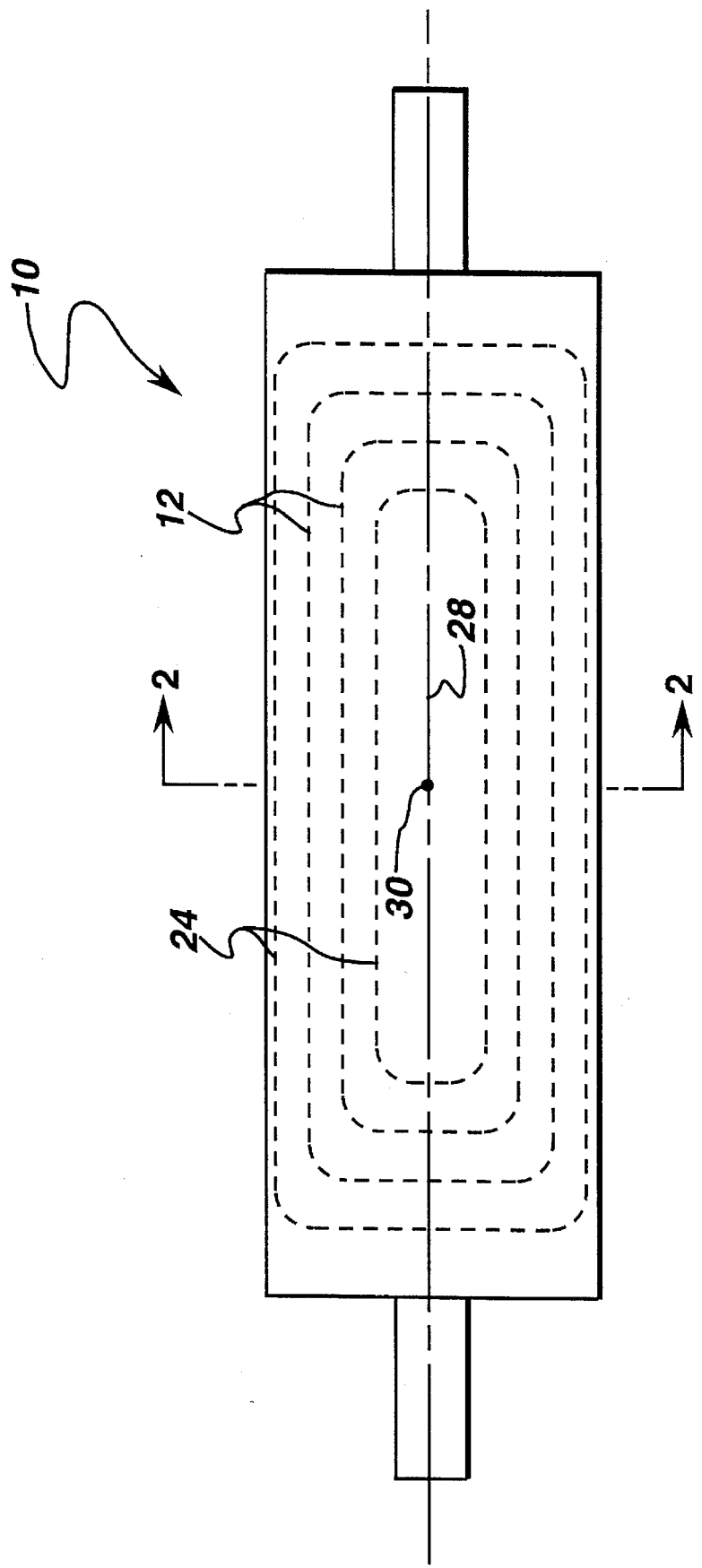
FIG. 1 is a schematic side elevational view of a first preferred embodiment of the superconducting device of the invention wherein the superconducting device is a superconducting rotor.
Figure 2:
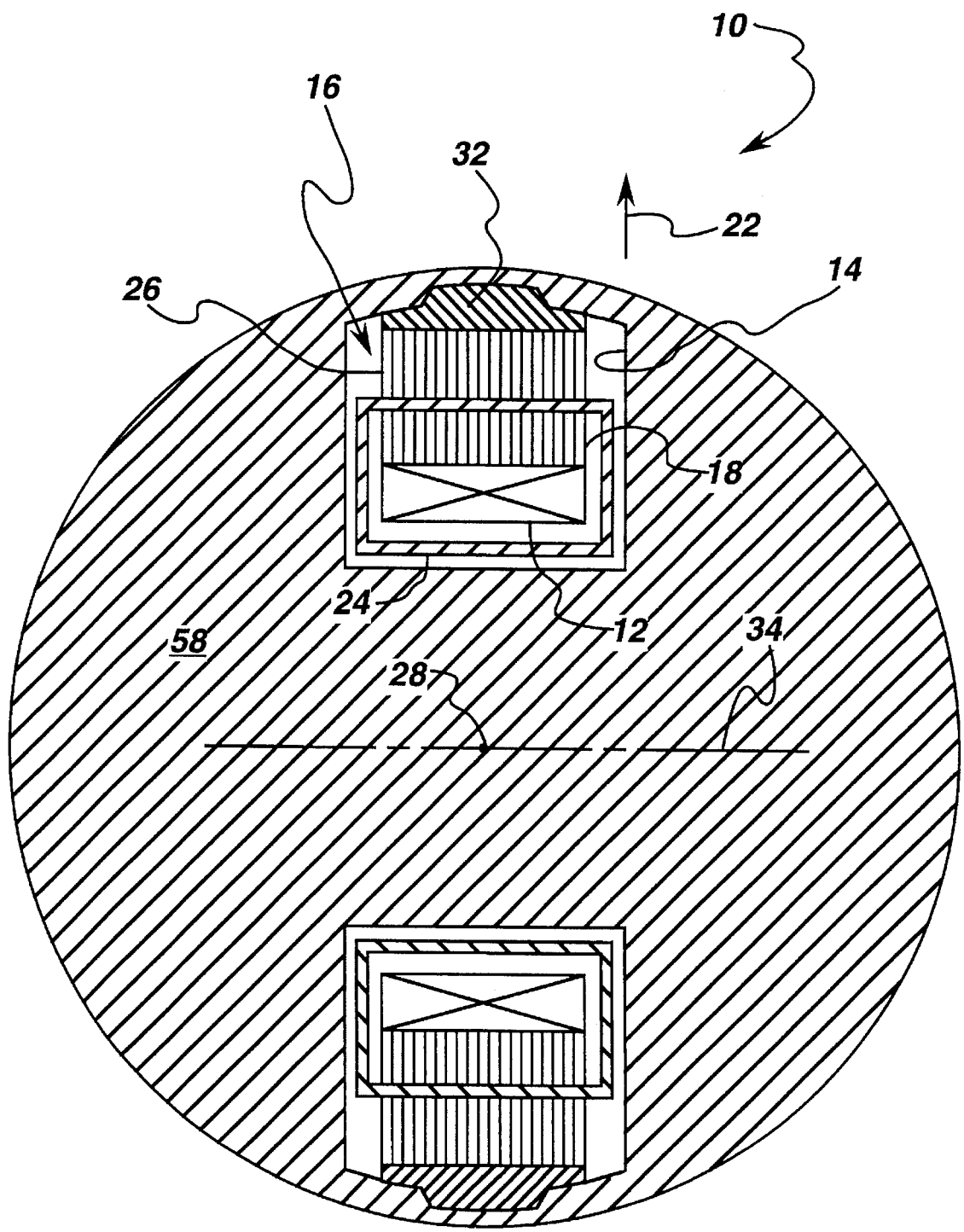
FIG. 2 is a schematic sectional view taken along lines 2—2 in FIG. 1 showing a coil support which utilizes two honeycomb assemblages.

Referring now to the drawings, wherein like numerals represent like elements throughout, FIGS. 1–2 show a first preferred embodiment of the superconducting device of the present invention wherein the superconducting device is a superconducting rotor 10. It is pointed out that the superconducting device of the present invention is not limited to a rotor, but includes any superconducting device such as, but not limited to, superconducting magnets for MRI (magnetic resonance imaging) machines, maglev (magnetic levitation) transportation systems, magnetic energy storage devices, and linear motors. Preferably, the superconducting rotor 10 is for a synchronous electrical machine, such as a generator or a motor. It is noted that conventional generators and motors may be retrofitted to have their non-superconducting rotors replaced with the superconducting rotor 10 of the present invention.

Figure 3:
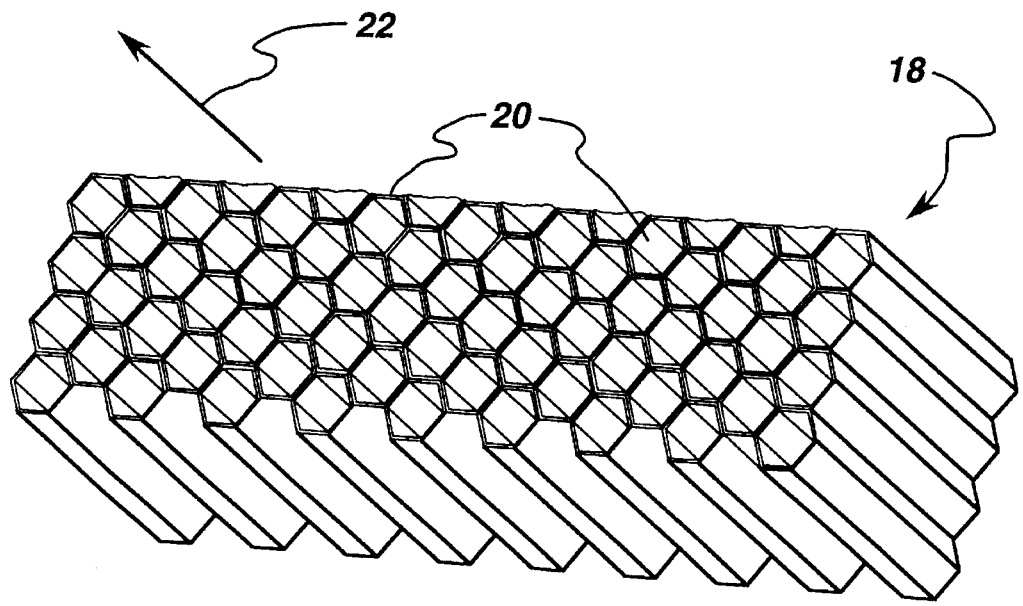
FIG. 3 is a perspective view of the bottom honeycomb assemblage shown in FIG. 2.
Figure 6:
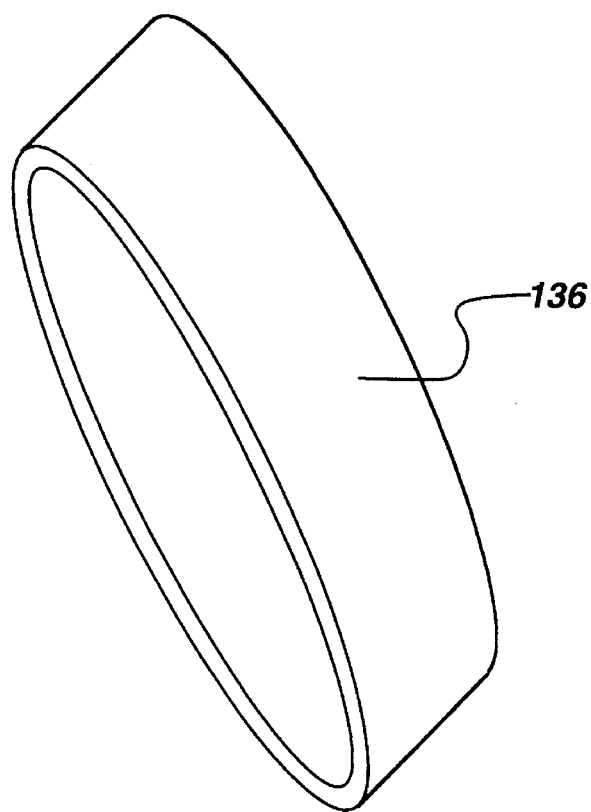
FIG. 6 is a perspective view of one of the suspension straps shown in FIG. 5.

The superconducting device shown in FIGS. 1 and 2 (i.e., the superconducting rotor 10) includes a superconductive coil 12, a vacuum enclosure 14 surrounding and spaced apart from the superconductive coil 12, and means 16 for supporting the superconductive coil 12 in the vacuum enclosure 14 during operation of the superconducting device (i.e., the superconducting rotor 10). The coil support means 16 includes a first thermally insulative honeycomb assemblage 18 disposed between the superconductive coil 12 and the vacuum enclosure 14. By "thermally insulative" is meant that the assemblage 18 has a coefficient of thermal conductivity generally not exceeding that of filamentary glass reinforced epoxy at a temperature of generally fifty Kelvin. Preferably, as shown in FIG. 3, the first thermally insulative honeycomb assemblage 18 includes a plurality of generally identical cells 20 having a common open direction 22 aligned to extend from the superconductive coil 12 to the vacuum enclosure 14. In an exemplary enablement, the first thermally insulative honeycomb assemblage 18 is a filamentary-reinforced-epoxy (FRE) composite honeycomb structure whose distance between opposing sides of a cell 20 ranges between generally one millimeter and generally one centimeter. The assemblage 18 provides a compression support structure having adequate lateral shear support and a low heat leak. It is noted that conventional support structures for superconducting coils employ discrete tension support members and discrete lateral support members.

Preferably, the superconducting device shown in FIGS. 1 and 2 (i.e., the superconducting rotor 10) also includes a thermal shield 24 disposed within and spaced apart from the vacuum enclosure 14 and surrounding and spaced apart from the superconductive coil 12. The first thermally insulative honeycomb assemblage 18 is disposed between and connected to the superconductive coil 12 and the thermal shield 24. Such connections may be direct or indirect connections and may be made by mechanical, chemical, or other means as is within the purview of the artisan. The first thermally insulative honeycomb assemblage 18 may or may not have a compressive preset depending on a particular application. In an exemplary embodiment, as shown in FIG. 2, the coil support means 16 also includes a second thermally insulative honeycomb assemblage 26 disposed between and connected to the thermal shield 24 and the vacuum enclosure 14. Each honeycomb assemblage 18 and 26 may be a monolithic (i.e., integral) assemblage or may consist of a multiplicity of discrete and spaced-apart or contacting sub-assemblages. From FIG. 1 it is noted that the superconducting rotor 10 has an axis or rotation 28 with a midpoint 30, and it is preferred that the connection of the second thermally insulative honeycomb assemblage 26 to the vacuum enclosure 14 be made only proximate the midpoint 30 such as, for example, by support member 32 for proper lateral centering. Such midpoint-only connection allows for differential thermal contraction between the cryogenic-temperature thermal shield 24 and the room-temperature vacuum enclosure 14, as can be appreciated by those skilled in the art.

In an exemplary embodiment, the superconductive coil 12 is a racetrack-shaped superconductive coil having a generally longitudinally extending axis 34 disposed generally perpendicular to the axis of rotation 28. It is noted that "racetrack-shape" includes straight sections connected by rounded corners. The superconducting rotor 10 shown in FIG. 2 is two-pole rotor. The superconducting device of the invention in the form of the superconducting rotor 10 of FIG. 2 is also applicable to other types of rotors such as multi-pole rotors (not shown in the figures) having a plurality of circumferentially spaced-apart racetrack-shaped superconductive coils whose longitudinally extending axes are disposed generally perpendicular to the axis of rotation. It is noted that the minor axis of each of the superconductive coils of a multi-pole rotor is disposed generally parallel to the circumferential direction of motion of the coil about the axis of rotation while the minor axis of the superconductive coil 12 of the two-pole rotor 10 shown in FIG. 2 (or a similar-designed four-pole rotor) is disposed generally perpendicular to the circumferential direction of motion of the coil 12 about the axis of rotation 28.

Figure 4:
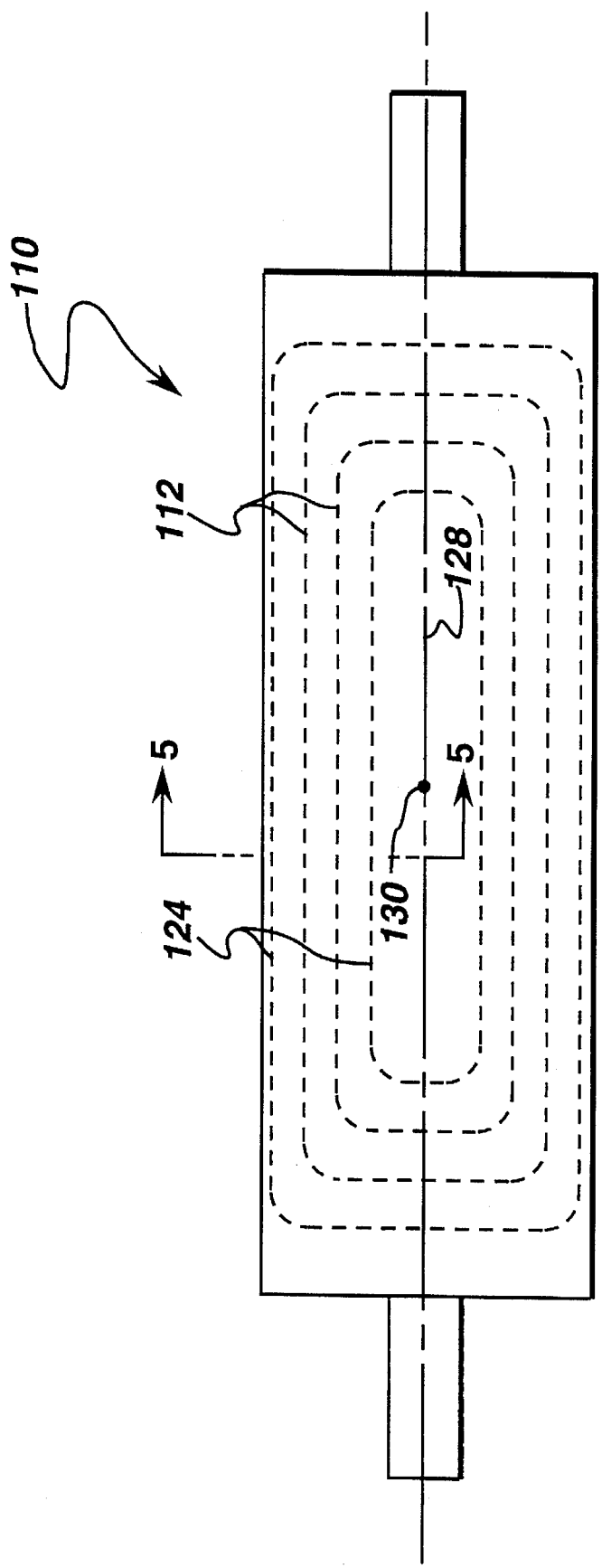
FIG. 4 is a schematic side elevational view of a second preferred embodiment of the superconducting device of the invention wherein the superconducting device is another superconducting rotor.
Figure 5:
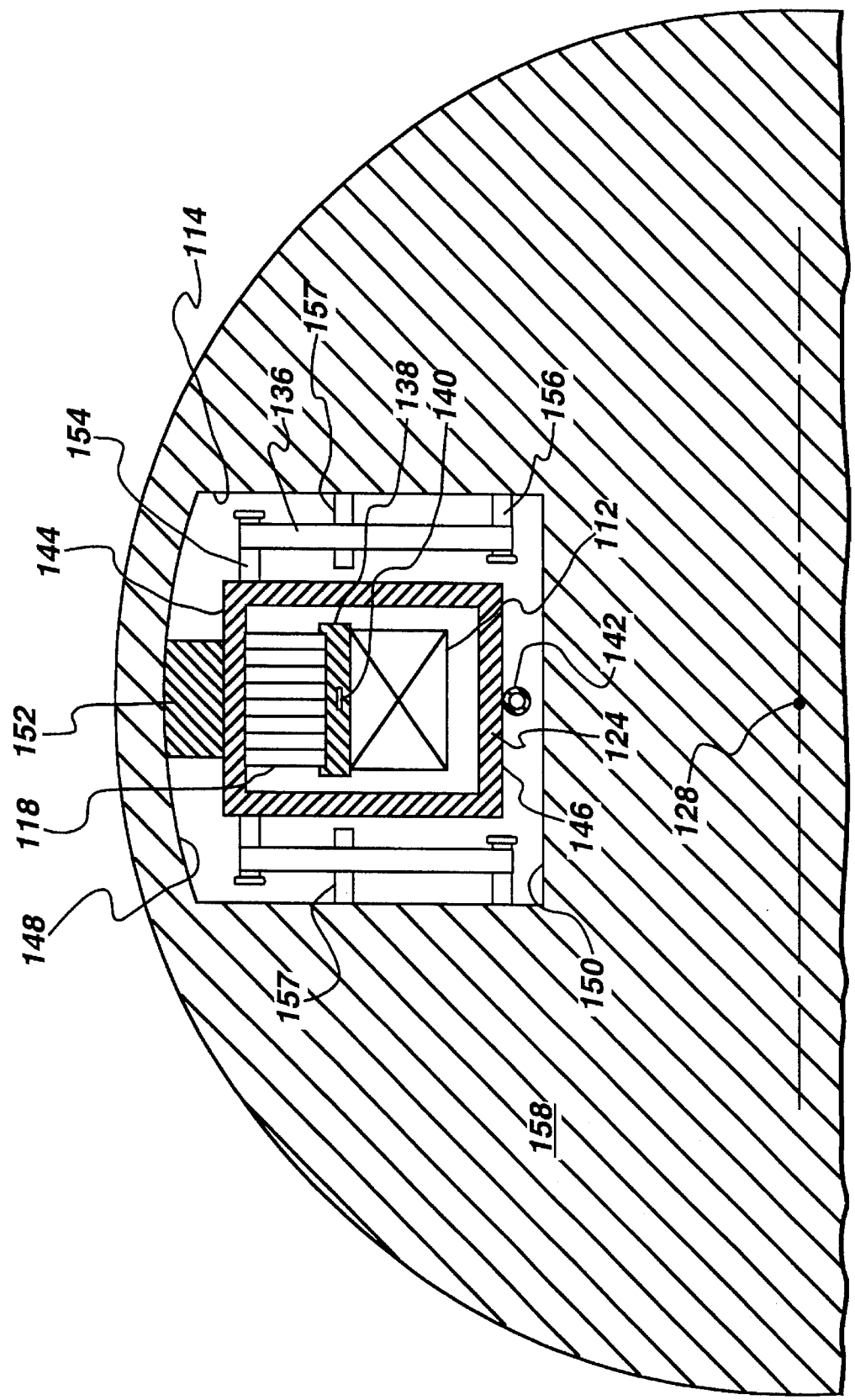
FIG. 5 is a schematic sectional view taken along lines 5—5 in FIG. 4 showing a coil support which utilizes suspension straps and one honeycomb assemblage.

FIGS. 4 and 5 show a second preferred embodiment of the superconducting device of the present invention wherein the superconducting device is another superconducting rotor 110. Rotor 110 is similar to rotor 10, but rotor 110 has a first thermally insulative suspension strap 136 instead of the second thermally insulative honeycomb assemblage 26 of rotor 10. The first suspension strap 136 is disposed between and connected to the thermal shield 124 and the vacuum enclosure 114. Preferably, the superconducting rotor 110 includes a thermal station 138 disposed between and directly attached to the superconductive coil 112 and the first thermally insulative honeycomb assemblage 118 with the thermal station 138 having a cooling channel 140 preferably containing gaseous helium at a temperature of generally ten Kelvin. A cooling tube 142 is in thermal contact with the thermal shield 124 and preferably contains gaseous helium at a temperature of generally twenty Kelvin. The vacuum enclosure 114 is generally at four hundred Kelvin. Preferably, the superconductive coil 112 is a niobium-tin superconductive coil.

In an exemplary embodiment, the thermal shield 124 is a generally toroidal-shaped thermal shield generally coaxially aligned with the superconductive coil 112 and having, with respect to the axis of rotation 128 of the superconducting rotor 110, a radially outermost portion 144 and a radially innermost portion 146. Likewise, the vacuum enclosure 114 has, with respect to the axis of rotation 128, a radially outermost portion 148 and a radially innermost portion 150. The radially outermost portions 144 and 148 of the thermal shield 124 and the vacuum enclosure 114 are fixedly connected only proximate the midpoint 130 of the axis of rotation 128 such as by support member 152 for proper lateral centering under conditions of differential thermal contraction, as can be appreciated by those skilled in the art.

Preferably, the first thermally insulative suspension strap 136 is a generally racetrack-shaped strap connected to the thermal shield 124 proximate the radially outermost portion 144 of the thermal shield 124 and connected to the vacuum enclosure 114 proximate the radially innermost portion 150 of the vacuum enclosure 114. The thermal shield 124 has a first pin 154 disposed proximate the radially outermost portion 144 of the thermal shield 124, and the vacuum enclosure 114 has a second pin 156 disposed proximate the radially innermost portion 150 of the vacuum enclosure 114. The first and second pins 154 and 156 project, with respect to the axis of rotation 128, along generally opposite circumferential directions. The racetrack-shaped strap (i.e., the first thermally insulative suspension strap) 136 is disposed to encompass the first and second pins 154 and 156. Such an arrangement provides support while allowing for differential thermal contraction between the thermal shield 124 and the vacuum enclosure 114 along the axis of rotation 128 and while minimizing the outer diameter of the vacuum enclosure 114, as can be appreciated by those skilled in the art. Tube supports 157, provide lateral support between the vacuum enclosure 114 and the thermal shield 124. Preferably, such tube supports 157 are high strength, low thermal conductivity FRE tubes.

In an exemplary embodiment, the superconducting rotors 10 and 110 each have a solid core 58 and 158 made of iron. For purposes of describing the present invention as shown in FIGS. 1–2 and 4–5, the poles of the superconducting rotor 10 and 110 are considered to include the radially outer portions of the solid core 58 and 158 in the vicinity of the superconductive coil 12 and 112, and the vacuum enclosure 14 and 114 is considered to be the walls of the solid core 58 and 158 which surround the thermal shield 24 and 124 and the superconductive coil 12 and 112. The superconductive coils 12 and 112 each are epoxy-impregnated and include a niobium-tin superconductive wire co-paired and co-wound with a stainless-steel support wire. The honeycomb assemblages 18, 118, and 26 are filamentary-reinforced-epoxy (FRE) honeycomb assemblages, and the suspension strap 136 is a uni-directional FRE suspension strap to minimize heat transfer.

An engineering analysis of an electric generator superconductive rotor designed in accordance with the principles of the present invention has shown the honeycomb assemblages 18, 118, and 26 to provide excellent mechanical support under substantial centrifugal loading and excellent thermal insulation properties. It is noted that the advantage of any superconductive rotor is the elimination of resistive loses and, because of cryogenic cooling, the elimination of thermal cycling problems. Air-core superconductive rotors require larger amounts of superconductive wire which adds to the number of coils required, the complexity of the coil supports, and the cost when compared with the preferably solid-core superconducting rotor 10 or 110 of the present invention.

The foregoing description of a preferred embodiment of the invention has been presented for purposes of illustration. It is not intended to be exhaustive or to limit the invention to the precise form disclosed, and obviously many modifications and variations are possible in light of the above teaching. For example, many suspension straps 136 typically would be employed in the superconducting rotor 110 of the second preferred embodiment of the invention and more than one superconductive coil 12 or 112 may be used in the superconductive rotor 10 or 110. It is intended that the scope of the invention be defined by the claims appended hereto.

We claim:

1. A superconducting device comprising:
   a) a superconductive coil;
   b) a vacuum enclosure surrounding and spaced apart from said superconductive coil; and
   c) means for supporting said superconductive coil in said vacuum enclosure during operation of said superconducting device, said means including a first thermally insulative honeycomb assemblage disposed between said superconductive coil and said vacuum enclosure, and
   wherein said first thermally insulative honeycomb assemblage includes a plurality of generally identical cells having a common open direction aligned to extend from said superconductive coil to said vacuum enclosure.

2. A superconducting device comprising:
   a) a superconductive coil;
   b) a vacuum enclosure surrounding and spaced apart from said superconductive coil;
   c) means for supporting said superconductive coil in said vacuum enclosure during operation of said superconducting device, said means including a first thermally insulative honeycomb assemblage disposed between said superconductive coil and said vacuum enclosure;
   d) a thermal shield disposed within and spaced apart from said vacuum enclosure and surrounding and spaced apart from said superconductive coil, wherein said first thermally insulative honeycomb assemblage is disposed between and connected to said superconductive coil and said thermal shield; and
   e) a first thermally insulative suspension strap disposed between and connected to said thermal shield and said vacuum enclosure.

3. The superconducting device of claim 2, wherein said superconducting device is a superconducting rotor having an axis of rotation with a midpoint, and wherein said superconductive coil is a racetrack-shaped superconductive coil having a generally longitudinally extending axis disposed generally perpendicular to said axis of rotation.

4. The superconducting rotor of claim 3, also including a thermal station disposed between and directly attached to said superconductive coil and said first thermally insulative honeycomb assemblage, said thermal station having a cooling channel.

5. The superconducting rotor of claim 3, wherein said thermal shield is a generally toroidal-shaped thermal shield generally coaxially aligned with said superconductive coil and having, with respect to said axis of rotation, a radially outermost portion and a radially innermost portion, wherein said vacuum enclosure has, with respect to said axis of rotation, a radially outermost portion and a radially innermost portion, and wherein said radially outermost portions of said thermal shield and said vacuum enclosure are fixedly connected only proximate said midpoint.

6. The superconducting rotor of claim 5, wherein said first thermally insulative suspension strap is a generally racetrack-shaped strap connected to said thermal shield proximate said radially outermost portion of said thermal shield and connected to said vacuum enclosure proximate said radially innermost portion of said vacuum enclosure.

7. The superconducting rotor of claim 6, wherein said thermal shield has a first pin disposed proximate said radially outermost portion of said thermal shield, wherein said vacuum enclosure has a second pin disposed proximate said radially innermost portion of said vacuum enclosure, wherein said first and second pins project, with respect to said axis of rotation, along generally opposite circumferential directions, and wherein said racetrack-shaped strap is disposed to encompass said first and second pins.

* * * * *